March 6, 1951     J. LIMBERGER     2,544,166
METER BEARING
Filed April 27, 1946
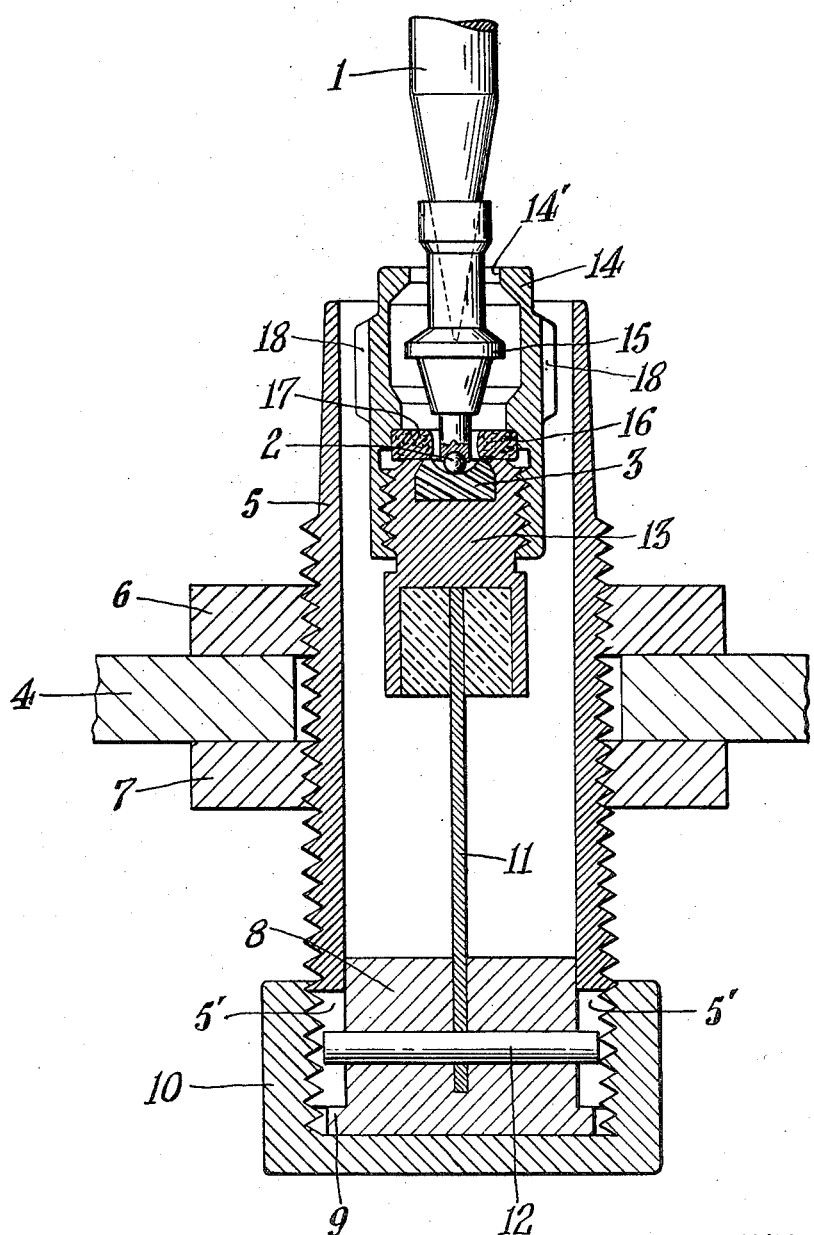
INVENTOR
Josef Limberger
BY
Morgan, Finnegan and Durham
ATTORNEYS Patented Mar. 6, 1951

2,544,166

UNITED STATES PATENT OFFICE 2,544,166

METER BEARING

Josef Limberger, Zug, Switzerland, assignor to Landis & Gyr, A. G., a body corporate of Sweden Application April 27, 1946, Serial No. 665,488
In Switzerland May 28, 1945

2 Claims. (Cl. 308—230)

The invention relates to electricity meters and more particularly to new and useful improvements of electricity meter bearings.

Objects and advantages of the invention will be set forth in part hereinafter and in part will be obvious herefrom, the same being realized and attained by means of the instrumentalities and combinations pointed out in the appended claims.

The invention consists in the novel parts, constructions, arrangements, combinations and improvements herein shown and described.

The accompanying drawing referred to herein and constituting a part hereof, illustrates one embodiment of the invention, and together with the description, serves to explain the principles of the invention.

The drawing is a fragmentary view in section of an electricity meter embodying the invention applied to the rotating spindle, bearing, and mount of these in an electricity meter.

Objects of the invention are to eliminate or damp the humming noises in electricity meters and to this end to provide controlled and predetermined directed resilient movement of the meter spindle bottom bearing; to provide a bottom support for the meter disc spindle permitting resilient movement in a predetermined direction while preventing motion of the said support in other directions; to provide a bottom support which precludes movement in the direction of the general plane of the driving core but permits resilient movement in the perpendicular direction; to provide a simple, sturdy and reliable structure which may be readily taken apart by hand, realizing said objects, together with others hereinafter pointed out or flowing from the novel features of the mechanism.

In accordance with the preferred embodiment of the invention, there is provided a bottom bearing structure for watt hour meters in which the rotating shaft is tipped with a ball revolving in a non-rotating cup. These are held in assembled relation with a support for the non-rotating part of the bearing, by a cap screw-threaded to the support and apertured to receive the shaft end, said shaft end within the cup being larger than the aperture to prevent displacement of the shaft without removal of the cap.

In certain respects, the present invention is an improvement on the meter construction shown in the prior patent to Indergand 2,233,781, March 4, 1941.

It will be understood that the foregoing general description and the following detailed description as well are exemplary and explanatory of the invention but are not restrictive thereof.

The accompanying drawing shows by way of example the preferred embodiment of the invention in section. The rotating shaft 1, ends in a ball 2, which revolves in a cup 3. The supporting bar or member 4 is fixed in the casing of an electricity meter. In the supporting bar or member 4 there is fixed a sleeve 5, secured against turning, which is held in the member 4 by means of nuts 6 and 7. A head 8, is introduced from below into the sleeve 5, which rests by means of a flange 9, against the end of the sleeve 5 and is held in the sleeve 5, by a cap nut 10. In the head 8, is mounted the lower end of a leaf spring 11, held therein by a pin 12 which extends at both sides into a slot 5' in the sleeve 5, which positioning of the end of the spring 11 predetermines that the plane of the leaf spring 12 will be held parallel to the plane of the core of the driving magnet. The top end of the leaf spring 11, is mounted in a block 13 which contains the non-rotating bearing cup 3. A cap 14 is placed over the rotating member of the bearing which is screw-threaded to the block 13.

The top opening 14' of the cap 14 is less in diameter than the collar 15 of the rotating shaft which is enclosed by the cap 14, thus preventing the displacement of the rotating shaft without removal of the cap. By means of a shoulder 16 on cap 14 a guard ring 17 is held firmly on the block 13. This guard ring may advantageously be constructed of fabric impregnated with a hard synthetic resin. To permit screwing on or off of the cap 14 there is provided thereon a knurling 18 around its periphery, which permits this operation to be effected directly by hand without use of a tool.

The cap provided with knurling around its periphery, and fitted over the running member of the bearing secures it against displacement on the cup member, and is screw-threaded on to the non-rotating part of the bearing. Thus is provided the possibility of easy assembling and taking down of the bearing without necessity of the use of tools such as had been necessary with a friction mounted cap.

The invention in its broader aspects is not limited to the specific mechanisms shown and described but departures may be made therefrom within the scope of the accompanying claims without departing from the principles of the invention and without sacrificing its chief advantages.

What I claim is:

1. In a bottom bearing for electricity meters having a rotating spindle, cup and ball bearing means for the end of the spindle, and a support in which a cup of said bearing means is countersunk, the combination of an apertured cap through which the spindle end extends threaded to said support and surrounding said bearing means and having an internal shoulder, and an annular guard ring seated on said support and the upper edge of said cup closely surrounding the spindle end when supported on said bearing means and engaged by said shoulder when the cap is in the screwed on position.

2. In a bottom bearing for electricity meters having a rotating spindle, cup and ball bearing means for the end of the spindle, and a support in which a cup of said bearing means is countersunk, the combination of an apertured cap through which the spindle extends threaded to said support and surrounding said bearing means and having an internal shoulder, an annular, radially inwardly extending portion on said cap substantially spaced axially from the end of the spindle, an annular, radially outwardly extending portion of said spindle of a diameter sufficiently great to prevent its passage through said annular radially inwardly extending portion of said cap, and an annular guard ring seated on said support and the upper edge of said cup closely surrounding the spindle end when supported on said bearing means and engaged by said shoulder when the cap is in the screwed on position on said support.

JOSEF LIMBERGER.

REFERENCES CITED

The following references are of record in the file of this patent:

UNITED STATES PATENTS

| Number | Name | Date |
|---|---|---|
| 1,022,503 | Pratt | Apr. 9, 1912 |
| 1,788,445 | Weinbrenner | Jan. 13, 1931 |
| 2,229,969 | Goss | Jan. 28, 1941 |
| 2,233,781 | Indergand | Mar. 4, 1941 |

FOREIGN PATENTS

| Number | Country | Date |
|---|---|---|
| 3,140 | Great Britain | 1907 |
| 542,719 | Great Britain | Jan. 23, 1942 |